June 17, 1941.  F. M. CRONENWETT  2,245,964
DAIRY ORDER INDICATOR
Filed June 10, 1940
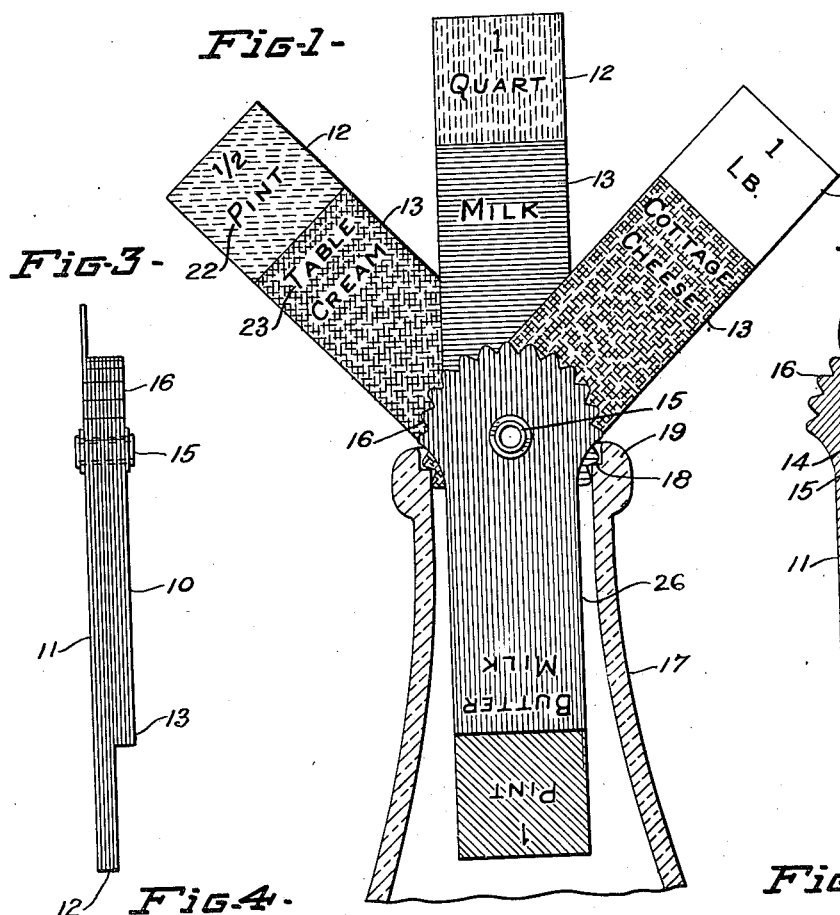
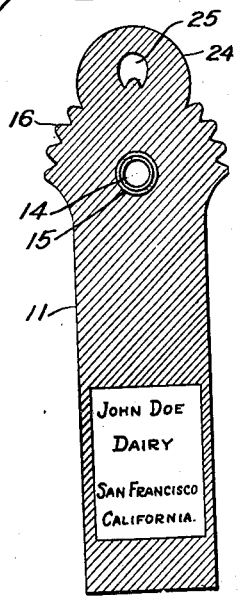
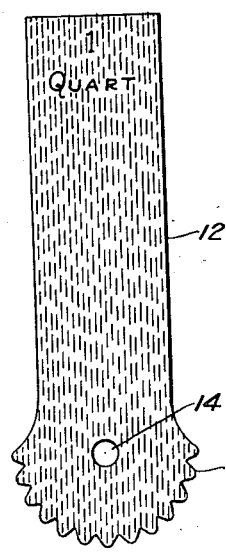
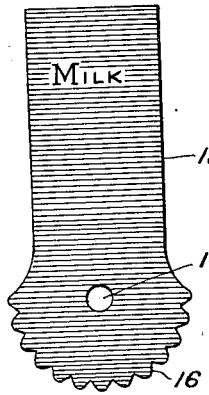
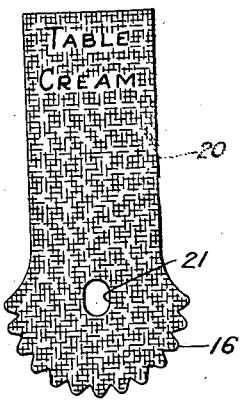
INVENTOR.
FRED M. CRONENWETT
BY Jas. M. Naylor
ATTORNEY Patented June 17, 1941

2,245,964

UNITED STATES PATENT OFFICE 2,245,964

DAIRY ORDER INDICATOR

Fred M. Cronenwett, San Francisco, Calif., assignor to H. S. Crocker Co., Inc., San Francisco, Calif., a corporation of California Application June 10, 1940, Serial No. 339,720

10 Claims. (Cl. 116—133)

This invention relates to dairy order indicators of the type which are adapted to be inserted in and supported by an empty milk bottle.

The devices of this class are usually furnished gratis by the dairy companies for the convenience of their customers in ordering supplies of the wares carried by the delivery man, and obviate the necessity of writing a special note and placing the same in an empty bottle. These devices are subject to repeated use and they must therefore be of sufficiently sturdy construction to withstand wear and tear and yet be comparatively inexpensive to manufacture. Additionally, the indicators of this class must be easy to operate so that all classes of persons, including children, may find them convenient to use.

In general terms the dairy order indicator forming the subject matter thereof comprises a plurality of order indicating flags arranged on a common pivot, permitting various of the flags to be raised into signal position, the remainder of the flags being grouped to form a shank for insertion into the empty bottle. Each of the flags has an enlarged head portion in the area of the pivot which combines to support the device at the bottle mouth.

I am aware of the fact that there are in this art devices of this general description, but they are objectionable for a number of reasons. None of the prior art devices provide means for locking the flags in their order indicating positions. Moreover, none of them made provision for the ordering of the full list of products offered for sale by the modern dairy companies, due, no doubt, to what was thought to be a space restriction in the diameter of the mouth of the milk bottle and the fact that the thickness of the flag type indicators should be kept within practical limits.

The shortcomings of the prior art structures, in the particulars mentioned, have been overcome by providing a means of positively locking the flags in their signal positions and by employing long and short flags, the former bearing quantitative indicia and the latter bearing the names of the products, to permit an infinite number of order combinations to be worked out by the user.

Other objects of this invention will become apparent as this specification proceeds.

Referring now to the drawing wherein a preferred but only illustrative embodiment of the invention is shown:

Fig. 1 is a front elevation of my dairy order indicator in use and supported at the mouth of a milk bottle.

Fig. 2 is a rear view of my device with all flags down in a non-signalling position.

Fig. 3 is a side elevation of the device in its closed position.

Fig. 4 is a front elevation of one of the long flags.

Fig. 5 is a front elevation of one of the short flags; and

Fig. 6 is a front elevation of a modified form of flag.

The dairy order indicator designated generally by the numeral 10 (Fig. 3) comprises a plurality of long flags 12 and short flags 13 formed of elongated cards held together for relative pivotal movement by an eyelet 15 extending through an aperture 14 adjacent one end of each of the flags (see Figs. 4 and 5). The flags are preferably made of wax-coated paper board, as this material is universally available at extremely low cost, but it will be understood that any other material which may be made up in thin strips may be employed within the spirit of invention.

In the embodiment shown, the flags 12 and 13 are of contrasting color to enable the delivery men to more readily read the indicated order. Additionally, the contrasting colors add to the artistic appearance of the device.

The ends of the flags through which the eyelet 15 is placed are enlarged to the form of a segment of a circle and the arcuate edge is provided with serrations 16 which cooperate to form the means for locking the flags in their order indicating positions (see Fig. 1). When a particular combination of flags 12 and 13 is raised or fanned out to indicate a specific order, the remaining flags are gathered together to form a shank 26 insertable in the neck of the bottle 17. This arrangement of the flags 12 and 13 turns the enlarged end portions of the flags to bring the serrations 16 into registry or substantial registry. When the order indicator forming the subject-matter hereof is put to its illustrated use the shank 26 is inserted in the conventional bottle 17, and the serrations 16 on opposite sides of the device are engaged and supported by the annular stopper seat 18, lying within the mouth 19 of the bottle 17. While one well known type of conventional milk bottle has been shown, it will be appreciated that the device will function equally as well with other types of bottles, containers or holders so long as a support is provided to be engaged by the serrations 16 to render the locking means effective. If any of the serrations are out of registry when the device is inserted in the bottle, gentle, downward pressure on the device will cause the extremely limited pivotal movement of the flags or particular flag necessary to effect the locking of the device, without disturbing the order indication arrangement of the flags.

The weight of the device, being below the flags arranged in order indicating positions will serve to hold the lock above described, against disarrangement of the indicated order by wind or like causes.

The back flag 11 may, if desired, carry advertising or descriptive matter on its reverse side (See Fig. 2). It is also provided with a projection 24 on its enlarged end having an aperture 25 therein for hanging the device from a hook or the like when not in use.

As previously stated, the long flags 12 carry indicia of quantitative measure, such as 22, while the short flags carry the names of the products, such as 23 (see Fig. 1). This feature of the invention permits use of the device to indicate an infinite number of order combinations. For instance, milk, table cream and buttermilk may be purchased in quarts, pints and half-pints. Were individual flags printed to indicate possible orders for these three products, there would be nine flags and, multiplied by the number of flags necessary to cover the full list of dairy products, the resulting device would be inoperative for the purpose intended. Here, however, but six flags are necessary to indicate nine possible orders.

Assuming that only one quart flag were provided in the device, it is still possible to simultaneously indicate an order for one quart of milk and one quart of table cream, by simply arranging the two pertinent short flags 13 at 45 degree angles to and on opposite sides of the corresponding long flag 12. When in this position the two flags 13 would overlay the long flag 12 for a substantial portion of their length and thus indicate definite association with that particular flag separate and apart from all others. Moreover, the above-described lock would still be effective to hold the flags in this specific type of order indicating arrangement.

The modification shown in Fig. 6 consists in making the eyelet aperture 21 of all the flags oval in shape. This permits downward movement of the flags selected for order indication to move the serrations 16 out of registry with the serrations 16 on the remaining flags, for positive engagement with the shoulder 18 in bottle 17. This modified form seems less desirable than the preferred form because it requires one additional adjustment of the device. However, it is useful and may be desirable for some specific purposes.

It is believed that the foregoing indicates that my device has decided advantages over the known structures in this class. It may take many forms in addition to those illustrated, and hence I desire protection according to the full scope of the appended claims.

The invention claimed is:

1. A dairy order indicator adapted to be supported adjacent a bottle mouth comprising a plurality of elongated cards attached together at one end for relative pivotal movement, each of said cards having an enlargement at the end at which they are attached, said cards being adapted to be inserted in a bottle and supported at the mouth thereof by said enlargement with certain of said cards raised above the bottle in an order indicating position, and means on the enlarged ends of the cards co-acting with the stopper seat of the bottle for locking the cards in their order indicating position.

2. A dairy order indicator adapted to be supported adjacent a bottle mouth, comprising a plurality of elongated cards attached together at one end for relative pivotal movement, each of said cards having an enlargement at the end at which they are attached, said cards being adapted to be inserted in a bottle and supported at the mouth thereof by said enlargements with certain of said cards raised above the bottle in an order indicating position, and means carried by the enlargement on said cards co-acting with the stopper set of the bottle for locking the cards in their order indicating position.

3. A dairy order indicator adapted to be supported adjacent a bottle mouth, comprising a plurality of elongated cards attached together at one end for relative pivotal movement, each of said cards having an enlargement at the end at which they are attached, said cards being adapted to be inserted in a bottle and supported at the mouth thereof by said enlargements with certain of said cards raised above the bottle in an order indicating position, and means integral with said cards co-acting with the stopper seat of the bottle for locking said cards when they are raised into an order indicating position.

4. A dairy order indicator comprising a plurality of elongated cards attached together at one end for relative pivotal movement, each of said cards having an enlargement at the end by which they are attached, the edges of the enlargements on each of said cards being serrated.

5. A dairy order indicator adapted to be supported adjacent a bottle mouth, comprising a plurality of elongated cards attached together at one end for relative pivotal movement, each of said cards having an enlargement at the end by which they are attached, the edges of the enlargements on each of said cards being serrated, the serrations on said enlargements on said cards co-acting with said bottle to lock the raised cards in the selected positions.

6. A dairy order indicator adapted to be supported adjacent a bottle mouth comprising a plurality of elongated cards attached together at one end for relative pivotal movement, each of said cards having an enlargement at the end at which they are attached, means carried by the cards co-acting with said bottle for locking the cards in the selected order indicating positions, certain of said cards being substantially shorter than the remainder to divide the cards into two groups, the cards of one group bearing quantitative measure indicia and the cards of the other group bearing indicia relative to products.

7. A dairy order indicator comprising in combination, a bottle, a plurality of elongated cards attached together at one end for relative pivotal movement, each of said cards having an enlargement at the end by which they are attached, the enlarged ends of the cards being of greater width than the diameter of the passage into the bottle, and means carried by the enlarged ends of the cards co-acting with the bottle to lock selected cards in a raised order indicating position.

8. A dairy order indicator comprising in combination, a milk bottle having an annular stopper seat within its mouth, a plurality of elongated cards attached together at one end for relative pivotal movement, each of said cards having an enlargement at the end by which they are attached, the enlarged ends of the cards being of greater width than the diameter of the passage into the bottle, and serrations on the enlarged ends of the cards co-acting with the stopper seat to lock selected cards in a raised order indicating position.

9. In combination, an order indicator comprising a plurality of elongated cards attached together at one end for relative pivotal movement, a support therefor, each of said cards having an enlargement at the end at which they are attached, and means carried by the enlargements on said cards co-acting with said support for locking selected cards in a raised order indicating position.

10. In combination, an order indicator comprising a plurality of elongated cards attached together at one end for relative pivotal movement, a support therefor, each of said cards having a serrated enlargement at the end at which they are attached, said serrations co-acting with said support for locking selected cards in a raised order indicating position.

FRED M. CRONENWETT.